United States Patent Office 3,792,182
Patented Feb. 12, 1974

3,792,182
MACHINE AND METHOD FOR MAKING A SOFT ICE PRODUCT FORMED OF FROZEN AIR-AND-GELATIN DISPERSION
Poerio Carpigiani, Anzola Enilia, Bologna, Italy
Continuation-in-part of abandoned application Ser. No. 8,529, Feb. 4, 1970. This application Apr. 10, 1972, Ser. No. 242,756
Int. Cl. A23g 5/00; F25c 7/14
U.S. Cl. 426—250
10 Claims

ABSTRACT OF THE DISCLOSURE

Making an edible frozen food product by subjecting an aqueous solution containing between about 5% and about 30% by weight of gelatin to sufficient heat to bring the solution above its melting and gelation temperatures, maintaining the aqueous solution at a first temperature range $T_1$ at or above its melting and gelation temperatures while mixing air into said aqueous solution to form a foam, feeding the foam into a refrigerated chamber to precool said foam, and simultaneously further cooling to a second temperature range $T_2$ below its freezing point annd whiping said foam initially cooled in the refrigerated chamber to produce a soft frozen dispensable food product.

REFERENCE TO RELATED APPLICATIONS

Figure 1:
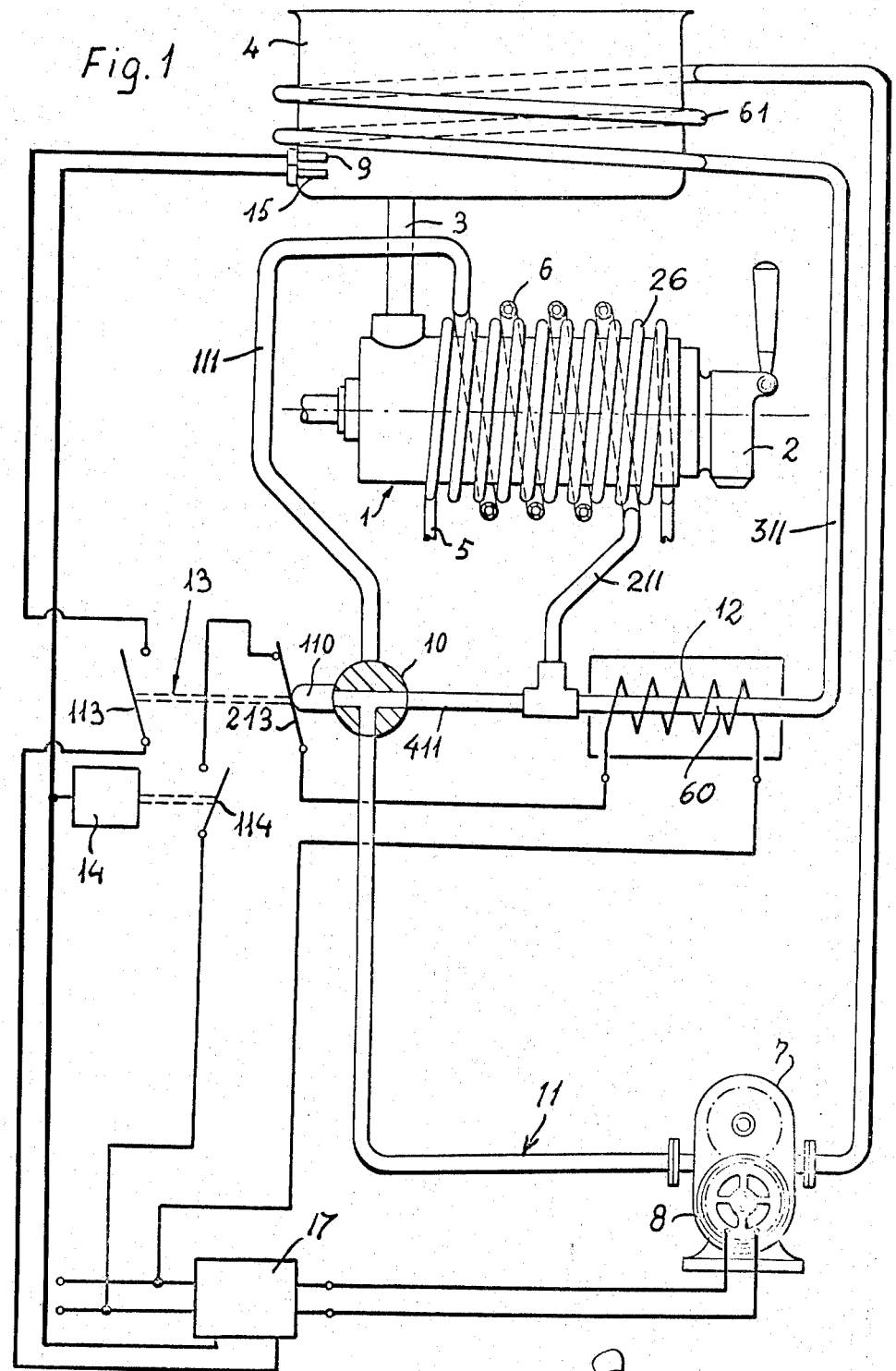

This application is a continuation-in-part of the application entitled, "Machine and Method for Making a Soft Ice Product Formed of Frozen Air-and-Gelatin Dispersion," Ser. No. 8,529, filed Feb. 4, 1970, now abandoned.

This invention relates to a method and a machine for the production of a dispensable soft ice cream product comprising a frozen dispersion or "foam" of gelatin and air.

It is an object of the present invention to provide a feasible method for making a soft ice cream product starting from an aqueous solution of gelatin.

A further object of the present invention is to provide a gelatin-based soft ice cream as a new edible product.

It is well known that gelatin is an excellent dietary supplement and that it is often nutritionally desirable to augment the intake of dietary protein, especially by growing children, by obese persons, and by the aged. Although gelatin products have been on the market for many years, the usual consistency of these products is gelatinous, rather than soft and finely grained as ice cream.

Although commercially available ice cream compositions frequently contain gelatin as a stabilizer, e.g., of the order of about 0.5% of the ice cream composition, the use of nutritionally valuable amounts of gelatin in soft dispensable ice cream products was not previously possible. Prior to the present invention, it was not feasible to maintain an ice cream mix containing more than stabilizing amounts of gelatin in the liquid mix tank of a continuous ice cream machine at the fluid consistency required for processing in such machines.

Among objections to frozen gel systems, e.g., those used for frozen desserts, is susceptibility to mechanical shock when the gel systems are subjected to excessive handling. Fracture of the gel system often results in a texture change in the product, which becomes unpalatable. Frozen gels frequently exhibit short shelf life prior to the onset of textural deterioration. Moreover, if the gel product is permitted to melt, the gel and any fruit suspended therein may tend to separate.

While alginate-carboxymethyl cellulose gels exhibit better behavior than other carbohydrate-based gels, as taught by Gücksman (U.S. Pat. 3,060,032), these products are not useful as dietary protein supplements. Gelatin-based gels which Gücksman froze and thawed were said to exhibit severely-broken gel structure and a very coarse, grainy eating texture.

Tressler (U.S. Pat. 2,588,308) teaches making a dry fruit whip composition comprising about 10% by weight of milk powder, 10% by weight of gelatin, 50% by weight of sugar, 30% by weight of dehydrated fruit, and a small amount of stabilizer. Although this product contains significant amounts of protein, it will be apparent that the high sugar content renders the product unsuitable for obse persons and others, e.g., diabetics, who might require protein supplements in their diets, but cannot tolerate foods high in carbohydrates. It is moreover apparent that when the Tressler composition is diluted with water in the recommended amounts, the total protein content is of the order of 4% by weight.

A frozen confection containing 12% to 40% by weight of heat-coagulable protein, e.g., egg white, and minimal amounts of fat has been prepared by Creswick (U.S. Pat. 3,556,813), who teaches whipping the confection to 150% to 400% overrun, coagulating the protein by electromagnetic radiation, and then freezing the resulting non-rubbery product. Although the product could probably be used as a protein dietary supplement, it has the disadvantages of requiring an expensive and relatively perishable protein, i.e., egg white, rather than a cheap and stable protein source, i.e., gelatin.

Compositions suitable for the gelatin-based soft ice cream of this invention comprise between about 5% by weight and about 30% by weight of gelatin. The remainder of the composition is substantially water. Sugar, e.g., glucose, dextrose, invert sugar, lactose, up to 10% by weight of the composition may be used. Alternatively, a non-nutritive sweetener, e.g., saccharin, may be employed. Flavoring, acidulant, coloring, and preservative ingredients may comprise up to a total of about 5% of the composition.

The preferred range of gelatin for the purpose of this invention is between about 12% and about 20% by weight.

A typical formulation is:

| | Parts by weight |
|---|---|
| Gelatin | 17 |
| Sugar | 3 |
| Water | 80 |
| Flavoring | To 1 |
| Coloring | To 1 |

Another useful formulation is:

| | Parts by weight |
|---|---|
| Gelatin | 20 |
| Acidulant | 2.5 |
| Mono -and di-sodium phosphate | 1 |
| Sodium cyclamate | 0.6 |
| Saccharin | 0.2 |
| Fruit color | 0.4 |
| Fruit flavor | 0.3 |
| Water | 75 |

A third formulation which may be used is:

| | Parts by weight |
|---|---|
| Gelatin | 15 |
| Sugar | 9 |
| Fruit color | 0.6 |
| Fruit flavor | 0.4 |
| Water | 75 |

In the practice of the present invention, previous inconveniences in handling soft ice cream formulations containing high amounts of gelatin are overcome in an efficient and economical manner by providing in the mix tank of a continuous ice cream machine means for heating the gelatin ice cream mix above the melting and gelation temperatures of the mix.

Figure 2:
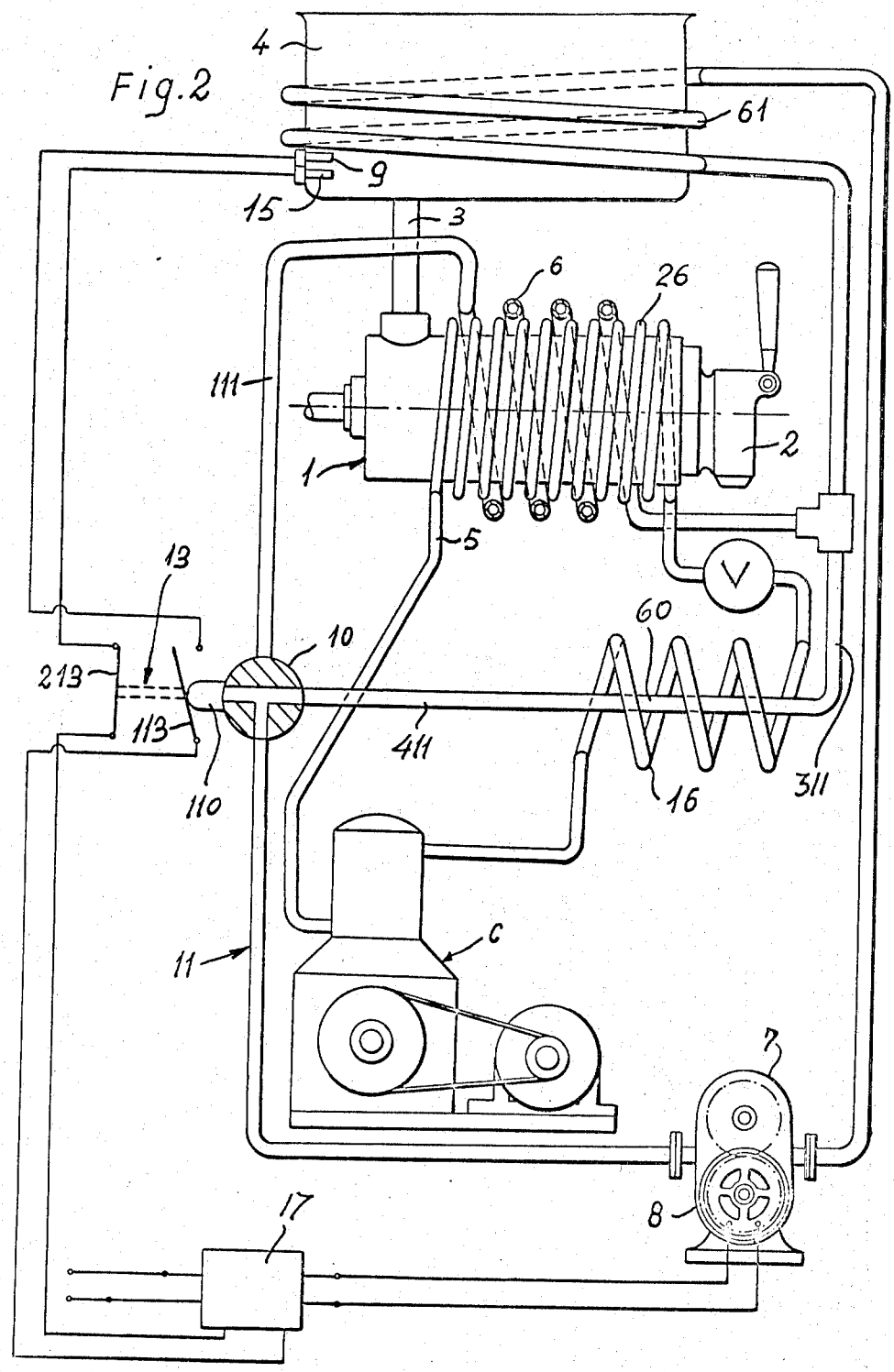

Further characteristic features and advantages of the present invention will be better apparent from the following specification of two embodiments of same, said specification being made with reference to the annexed diagrammatic drawings in which:

FIG. 1 is a first embodiment of the ice cream machine according to the invention, in which the ice cream mix tank is heated through a fluid circuit in heat exchange relation with electric heating means, and FIG. 2 is a second embodiment of the invention in which the said fluid circuit is heated by means of the condenser of the freezing unit of the ice cream machine.

With reference to the drawings, 1 denotes the mixing cylinder of a continuous type soft ice cream machine. Said cylinder carries at one end, as usual, an ice cream dispensing unit 2, while at its opposite end it is connected, for example through an upright pipe 3, with the mix tank 4 of the liquid mix to be frozen.

All around the cylinder 1 the evaporator coil 26 of the freezing unit of the ice cream machine is wound. The freezing unit comprises, as usual (see FIG. 2) a motor operated compressor C, which is connected through pipe 5 to one end of the evaporator coil 26, the other end of the said evaporator coil 26 being connected, through a suitable valve V to one end of the condenser 16, which in turn is connected at its other end to the compressor C.

With reference to FIG. 1, the mix tank 4 is encircled by a coil section 61, in heat exchange relation therewith, forming part of a closed heat-transfer circuit 11 comprising a circulation pump 7, which is operated by motor 8, a coil section 6 in heat exchange relation with the evaporator 27, as well as a pipe section 60 in heat exchange relation with an electric heating element 12.

The reference 10 denotes a switch valve by means of which it is possible to insert the coil section 6 and the pipe section 60 in series through pipes 111, 211 and 311 in the circuit 11, or to by-pass the coil section 6, thus switching into circuit 11 the pipe section 60 only, through pipes 411 and 311.

The switch valve 10 is provided with a cam 110 acting on the multiple switch 13. The switch 13 is provided with a first contact 113 disposed in the electric circuit of a thermostat 9 mounted inside of tank 4 and adjusted to control the temperature of the liquid mix inside said tank within a temperature range of about $-3$ to $-6°$ C. (low-temperatures thermostat). The second contact 213 of switch 13 is inserted into the electric circuit of the heating element 12. A second thermostat 15 is provided inside of tank 4, which thermostat 15 is adjusted to control the temperature of the liquid inside of tank 4 within a temperature range of say $5°$ to $30°$ C., and preferably $20$ to $30°$ C. The said thermostat operates, through relay 14, a switch 114 inserted in series with switch 213 into the circuit of the heating element 12.

Both thermostats 9 and 15 control independently through relay 17 the electric current feed to motor 8 of the pump 7.

The operation of the described machine is as follows:

For the production of the usual soft ice cream, that is of milk containing ice cream, it is necessary to maintain the liquid ice cream mix inside of tank 4 at a low temperature, in order to avoid the development of germs in said mix.

To this end, the switch valve 10 is switched to a position in which the coil section 6 and the pipe section 60 are series connected in the circuit 11.

By the above-referred movement of the switch valve, the cam 110 associated to switch valve 10 is brought into a position in which the switch 113 is closed and the switch 213 is open. In this manner, the thermostat 9 is inserted into the electric control circuit and the electric heating element is disconnected from the electric circuit.

The liquid in circuit 11 is circulated by the pump 7, operated by motor 8 controlled now by thermostat 9. The said liquid is now circulated through pipe 111, coil section 6, pipe 211, pipe section 60, pipe 311 and coil section 61, thus cooling tank 4.

Whenever it is desired to use the machine described for the production of gelatin ice cream according to the invention, the valve 10 is switched into the position shown in FIG. 1, in which coil section 6 is bypassed from fluid circuit 11.

As best shown in FIG. 1, by switching valve 10 in the said position, the cam 110 operates switch 13 so as to close contact 213 and to open contact 113. The opening of contact 113 sets thermostat 9 out of the electric control circuit of the machine. Themostat 15 is now operative, and it energizes relay 14, which in turn closes switch 114, thus inserting the electric heating element 12 into the electric circuit of the machine. The pump 7 is now circulating the heat transfer liquid in circuit 11 through pipe 411, heated pipe section 60, pipe 311 and coil section 61. In this manner, the liquid in tank 4 is heated to the desired temperature, under the control of thermostat 15, by the heated fluid circulating in circuit 11.

Whenever the temperature of the gelatin liquid mix in tank 4 attains a prefixed value, corresponding to the melting point temperature of the gelatin liquid mix, the thermostat 15 deenergizes relays 14 and 17, thus opening contact 114 excluding the heating element 12 from the electric circuit of the machine, and stopping motor 8.

In FIG. 2 a second embodiment of the invention is shown.

The said embodiment is substantially corresponding to the embodiment of FIG. 1, and the same reference numerals are being used in FIG. 2 to designate the same corresponding parts of the machine described with reference to FIG. 1.

The main difference between the embodiment of FIG. 2 and the one of FIG. 1 resides in the fact that according to FIG. 2 the pipe section 60 of the heat transfer circuit 11 is heated by the condenser 16 of the refrigerating machine, instead of by electric heating elements.

To this end, the pipe section 60 and the soil section 6 are each forming part of two parallel branches 411, 311 viz. 111, 211 of the liquid heat transfer circuit 11.

The said branches may be selectively switch through valve 10 into the circuit of the heat exchange fluid.

The cam 110 of valve 10 controls switches 113 and 213, which are inserted in the circuits of thermostats 9 and 15.

The operation of the embodiment of FIG. 2 is the same as described with reference to FIG. 1.

In the production of gelatin-based dispensable soft ice cream of this invention, a gelatin solution described above as being suitable is maintained above its heating and gelation temperatures in tank 4 by means of the heating circuit described. The fluid solution of gelatin is thereafter maintained at a temperature range $T_1$ at or above its melting and gelation temperatures while being mixed with air to form a foam. The resulting foam is fed into a refrigerated chamber in which it is initially cooled. The initially cooled foam is stimultaneously further cooled to a temperature range $T_2$ and mixed with air in the freezing cylinder 1 of the machine in which the desired soft ice cream is produced.

In one embodiment of this process, fluid gelatin solution is heated to a temperature range $T_1$ between $5°$ and $30°$ C., preferably between $20°$ and about $30°$ C., to maintain its fluidity. The choice of the temperature is a function of several factors, but the general rule can be stated that a higher temperature is required when gelatin concentrations approach the higher end of the operable range. In order to minimize energy expenditure, the temperature range chosen at $T_1$ should be as low as possible to minimize the temperature drop required in the subsequent cooling and freezing operations.

The freezing chamber 1 is refrigerated at a temperature range $T_2$ between $-5°$ and $-50°$ C., but preferably between about $-20°$ and $-40°$ C. while the initially cooled foam is simultaneously further cooled below its freezing point and whipped.

In another useful embodiment of this process, the liquid gelatin solution in tank 4 may be heated at a temperature range $T_1$ well above its melting and gelation points, and advantageously at a temperature at which germs are destroyed, for example, at a temperature range $T_1$ in the range between 70° and 100° C.

What is claimed is:

1. A method for making an edible soft frozen dispensable ice cream product comprising the steps of subjecting an aqueous solution containing between about 5% by weight and about 30% by weight of gelatin to sufficient heat to bring the solution above its melting and gelation temperatures, maintaining the aqueous solution with a first temperature range at or above its melting and gelation temperatures while mixing air into said aqueous solution to form a foam, feeding the foam into a refrigerated chamber to initially cool said foam, and simultaneously further cooling to a temperature within a second temperature range below its freezing point and whipping said initially cooled foam to produce the frozen food product.

2. The method of claim 1, wherein the aqueous solution contains between about 12% and about 20% by weight of gelatin.

3. The method of claim 1, wherein the aqueous solution contains up to about 10% by weight of sugar.

4. The method of claim 1, wherein the aqueous solution contains between about 5% by weight and about 30% by weight of gelatin, up to about 10% by weight of sugar, and up to a total of about 5% by weight of a combination of flavoring, coloring, acidulant, and preservative ingredients.

5. The method of claim 1 wherein the first temperature range is between about 5° and about 30° C., and wherein the second temperature range is between about —5° and about —50° C.

6. The method of claim 1, wherein the first temperature range is between about 20° and about 30° C., and wherein the second temperature range is between about —20° and about —40° C.

7. The method of claim 1, wherein the first temperature range is between about 70° and about 100° C., and wherein the second temperature range is between about —5° and about —50° C.

8. The method of claim 1, wherein the aqueous solution contains between about 5% and about 30% by weight of gelatin, up to about 10% by weight of sugar, and up to a total of about 5% by weight of a combination of flavoring, coloring, acidulant, and preservative ingredients, and wherein the first temperature range is between about 5° and about 30° C.

9. The method of claim 1, wherein the aqueous solution contains between about 5% and about 30% by weight of gelatin, up to about 10% by weight of sugar, and up to a total of about 5% by weight of a combination of flavoring, coloring, acidulant, and preservative ingredients, and wherein the first temperature range is between about 20° and about 30° C.

10. The method of claim 1, wherein the aqueous solution contains between about 5% and about 30% by weight of gelatin, up to about 10% by weight of sugar, and up to a total of about 5% by weight of flavoring, coloring, acidulant, and preservative ingredients, and wherein the temperature range is between about 70° and about 100° C.

References Cited

UNITED STATES PATENTS 2,588,308  3/1952  Tressler _____ 99—136

OTHER REFERENCES

U.S. Dept. of Agriculture, "Velva Fruit—A New Frozen Dessert," Western Reg. Res. Lab., ALC–40, Rev. #1, Albany, Calif., March 1946.

A. LOUIS MONACELL, Primary Examiner

J. M. HUNTER, Assistant Examiner

U.S. Cl. X.R.

426—327, 351, 350, 360, 380, 524